US011297472B2

(12) United States Patent
Hahn

(10) Patent No.: US 11,297,472 B2
(45) Date of Patent: Apr. 5, 2022

(54) METHOD AND APPARATUS FOR LOAD DISTRIBUTION USING A PLURALITY OF CARRIERS IN COMMUNICATION SYSTEM SUPPORTING VEHICLE-TO-EVERYTHING COMMUNICATION

(71) Applicants: Hyundai Motor Company, Seoul (KR); Kia Motors Corporation, Seoul (KR)

(72) Inventor: Gene Beck Hahn, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 148 days.

(21) Appl. No.: 16/031,825

(22) Filed: Jul. 10, 2018

(65) Prior Publication Data

US 2019/0239039 A1 Aug. 1, 2019

Related U.S. Application Data

(60) Provisional application No. 62/625,022, filed on Feb. 1, 2018.

(30) Foreign Application Priority Data

May 16, 2018 (KR) .................. 10-2018-0056067

(51) Int. Cl.
| | | |
|---|---|---|
| H04W 4/40 | (2018.01) | |
| H04W 72/04 | (2009.01) | |
| H04W 28/08 | (2009.01) | |
| H04W 88/08 | (2009.01) | |
| H04W 88/02 | (2009.01) | |

(52) U.S. Cl.
CPC ............ *H04W 4/40* (2018.02); *H04W 28/08* (2013.01); *H04W 72/044* (2013.01); *H04W 88/02* (2013.01); *H04W 88/08* (2013.01)

(58) Field of Classification Search
CPC ............... H04W 72/042; H04W 72/04; H04W 72/0446; H04W 4/40; H04W 72/14
See application file for complete search history.

(56) References Cited

U.S. PATENT DOCUMENTS

| | | | | |
|---|---|---|---|---|
| 2018/0049235 | A1* | 2/2018 | Baghel | H04W 76/14 |
| 2018/0270812 | A1* | 9/2018 | Lee | H04W 76/10 |
| 2018/0332564 | A1* | 11/2018 | Lee | H04W 4/40 |
| 2018/0359735 | A1* | 12/2018 | Lee | H04W 72/042 |
| 2019/0014563 | A1* | 1/2019 | Lee | H04W 4/40 |
| 2019/0045337 | A1* | 2/2019 | Sun | H04W 4/46 |
| 2019/0045507 | A1* | 2/2019 | Sorrentino | H04W 76/14 |
| 2019/0082454 | A1* | 3/2019 | Shi | H04W 4/40 |
| 2019/0116565 | A1* | 4/2019 | Chae | H04W 24/10 |

(Continued)

*Primary Examiner* — Asad M Nawaz
*Assistant Examiner* — Najeeb Ansari
(74) *Attorney, Agent, or Firm* — Mintz Levin Cohn Ferris Glovsky and Popeo, P.C.; Peter F. Corless

(57) ABSTRACT

An operation method of a first communication node in a communication system supporting Vehicle-to-Everything (V2X) communications can include: determining at least one frequency band for transmission of semi-persistent scheduling (SPS) traffic; generating user equipment (UE) assistance information including information indicating the at least one frequency band; and transmitting the UE assistance information to a base station supporting the V2X communication.

17 Claims, 7 Drawing Sheets

(56) References Cited

U.S. PATENT DOCUMENTS

| | | | |
|---|---|---|---|
| 2019/0116608 A1* | 4/2019 | Kim | H04W 72/04 |
| 2019/0116609 A1* | 4/2019 | Feng | H04W 4/46 |
| 2019/0132832 A1* | 5/2019 | Uchiyama | H04W 72/10 |
| 2019/0150147 A1* | 5/2019 | Lee | H04W 4/40 |
| 2019/0150187 A1* | 5/2019 | Park | H04B 7/024 |
| | | | 370/330 |
| 2019/0182840 A1* | 6/2019 | Feng | H04W 72/06 |
| 2019/0239112 A1* | 8/2019 | Rao | H04W 4/40 |
| 2019/0239264 A1* | 8/2019 | Hahn | H04W 4/40 |
| 2020/0059915 A1* | 2/2020 | Lee | H04W 72/0406 |
| 2020/0229188 A1* | 7/2020 | Tang | H04W 72/04 |
| 2020/0288431 A1* | 9/2020 | Lee | H04W 72/0446 |
| 2020/0374859 A1* | 11/2020 | Han | H04W 72/02 |

\* cited by examiner

METHOD AND APPARATUS FOR LOAD DISTRIBUTION USING A PLURALITY OF CARRIERS IN COMMUNICATION SYSTEM SUPPORTING VEHICLE-TO-EVERYTHING COMMUNICATION

CROSS-REFERENCE TO RELATED APPLICATIONS

This application claims the benefit of priority to U.S. Provisional Patent Application No. 62/625,022, filed on Feb. 1, 2018 in the U.S. Patent and Trademark Office, and Korean Patent Application No. 10-2018-0056067, filed on May 16, 2018 in the Korean Intellectual Property Office (KIPO), the entire contents of which are incorporated herein by reference.

BACKGROUND

1. Technical Field

The present disclosure relates generally to vehicle-to-everything (V2X) communication, and more specifically, to a method and an apparatus for load distribution using a plurality of carriers.

2. Related Art

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on "sidelink" communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels.

In a cellular communication system supporting V2X communications (e.g., C-V2X communications), a vehicle, in which a communication node is disposed, may use a carrier configured based on a semi-persistent scheduling (SPS) scheme to communicate with a communication node (e.g., a communication node located in another vehicle, a communication node located in the infrastructure, or a communication node carried by a person). However, in a case that a load of the carrier configured based on the SPS scheme increases, data of the vehicle, often having high reliability and low latency requirements, such as Decentralized Environment Notification Message (DENM), Cooperative Awareness Message (CAM), and the like, may not be successfully transmitted or received. In this case, serious problems may occur due to a communication failure of the vehicle.

SUMMARY

Accordingly, embodiments of the present disclosure provide an apparatus and a method for load distribution using a plurality of carriers when a Semi-Persistent Scheduling (SPS) scheme is used in a communication system supporting V2X communications.

According to embodiments of the present disclosure, an operation method of a first communication node in a communication system supporting Vehicle-to-Everything (V2X) communication can include: determining at least one frequency band for transmission of semi-persistent scheduling (SPS) traffic; generating user equipment (UE) assistance information including information indicating the at least one frequency band; and transmitting the UE assistance information to a base station supporting the V2X communication.

The operation method may further comprise receiving, from the base station, a SPS configuration activation message for a frequency band determined based on the UE assistance information.

The SPS configuration activation message may include information indicating the frequency band to which SPS configuration is applied.

The at least one frequency band may be determined based on a channel busy ratio (CBR) measured by the first communication node.

The determining of the at least one frequency band may comprise measuring congestion in a first frequency band used for the V2X communication with a second communication node; and determining the at least one frequency band for transmission of the SPS traffic when the congestion in the first frequency band is greater than or equal to a predetermined threshold.

The information indicating the at least one frequency band may indicate a set of two or more frequency bands.

The information indicating the at least one frequency band may be a bitmap indicating an available frequency band for transmission of the SPS traffic among aggregated frequency bands.

The operation method may further comprise generating a SPS configuration applied to the at least one frequency band, and the SPS configuration may be transmitted to the base station using the UE assistance information.

In the generating a SPS configuration, when a number of frequency bands to which the SPS configuration is applied is N and a transmission interval in a prior V2X communication procedure of the first communication node is T transmission time intervals (TTIs), a transmission interval in the SPS configuration may be set to N×T TTIs, N may be an integer greater than or equal to 2, and T may be an integer greater than or equal to 1.

In generating a SPS configuration, when a number of frequency bands to which the SPS configuration is applied is N and a transmission interval in a prior V2X communication procedure of the first communication node is T TTIs, a transmission interval in the SPS configuration may be set to T TTIs, a size of data transmitted through each of the N frequency bands may equal (a size of total data to be transmitted to a second communication node which performs the V2X communication with the first communication node)/N, N may be an integer greater than or equal to 2, and T may be an integer greater than or equal to 1.

In the generating a SPS configuration, when a number of frequency bands to which the SPS configuration is applied is N and a transmission interval in a prior V2X communication procedure of the first communication node is T TTIs, a transmission interval in the SPS configuration may be set to T TTIs, a size of data transmitted through each of the N frequency bands may be inversely proportional to a congestion of each of the N frequency bands, N may be an integer greater than or equal to 2, and T may be an integer greater than or equal to 1.

Furthermore, in accordance with embodiments of the present disclosure, an operation method of a base station in a communication system supporting Vehicle-to-Everything (V2X) communication can include: receiving, from a first communication node, user equipment (UE) assistance information including information indicating frequency bands for transmission of semi-persistent scheduling (SPS) traffic; determining at least one frequency band to which a SPS configuration is applied among the frequency bands indicated by the UE assistance information; and transmitting, to the first communication node, a SPS configuration activation message instructing activation of the SPS configuration for the at least one frequency band.

The SPS configuration activation message may include information indicating the at least one frequency band to which the SPS configuration is applied.

The frequency bands for transmission of the SPS traffic may be determined based on a channel busy ratio (CBR) measured by the first communication node.

The information indicating the frequency bands for transmission of the SPS traffic may indicate a set of two or more frequency bands.

The information indicating the frequency bands for transmission of the SPS traffic may include a bitmap indicating an available frequency band for transmission of the SPS traffic among aggregated frequency bands.

The operation method may further comprise generating the SPS configuration to be applied to the at least one frequency band, and the SPS configuration may be transmitted to the first communication node via the SPS configuration activation message.

In the generating a SPS configuration, when a number of frequency bands to which the SPS configuration is applied is N and a transmission interval in a prior V2X communication procedure of the first communication node is T transmission time intervals (TTIs), a transmission interval in the SPS configuration may be set to N×T TTIs, N may be an integer greater than or equal to 2, and T may be an integer greater than or equal to 1.

In the generating a SPS configuration, when a number of frequency bands to which the SPS configuration is applied is N and a transmission interval in a prior V2X communication procedure of the first communication node is T TTIs, a transmission interval in the SPS configuration may be set to T TTIs, a size of data transmitted through each of the N frequency bands may equal (a size of total data to be transmitted to a second communication node which performs the V2X communications with the first communication node)/N, N may be an integer greater than or equal to 2, and T may be an integer greater than or equal to 1.

In the generating a SPS configuration, when a number of frequency bands to which the SPS configuration is applied is N and a transmission interval in a prior V2X communication procedure of the first communication node is T TTIs, a transmission interval in the SPS configuration may be set to T TTIs, a size of data transmitted through each of the N frequency bands may be inversely proportional to a congestion of each of the N frequency bands, N may be an integer greater than or equal to 2, and T may be an integer greater than or equal to 1.

According to the embodiments of the present disclosure, when the SPS scheme is used in a communication system supporting V2X communications, the SPS configuration may reconfigured based on CBRs, and the V2X communications can be performed over a plurality of carriers to which the changed SPS configuration is applied. That is, when a load on a specific carrier suddenly increases, the load can be distributed through the plurality of carriers, and thus data having high reliability and low latency requirements, DENM, CAM, or the like can be successfully transmitted and received. Therefore, quality of service (QoS) for the V2X communications can be enhanced, and the performance of the communication system can be improved.

BRIEF DESCRIPTION OF DRAWINGS

Embodiments of the present disclosure will become more apparent by describing in detail embodiments of the present disclosure with reference to the accompanying drawings, in which.

Figure 1:
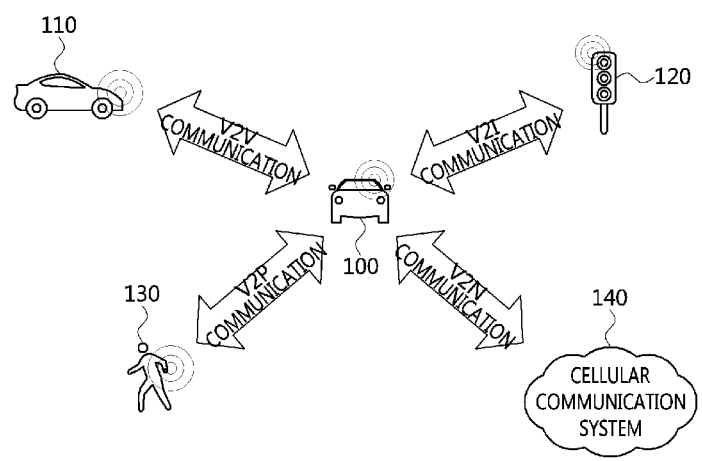
FIG. 1 is a conceptual diagram illustrating V2X communication scenarios.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus (e.g., communication node) comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110, may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
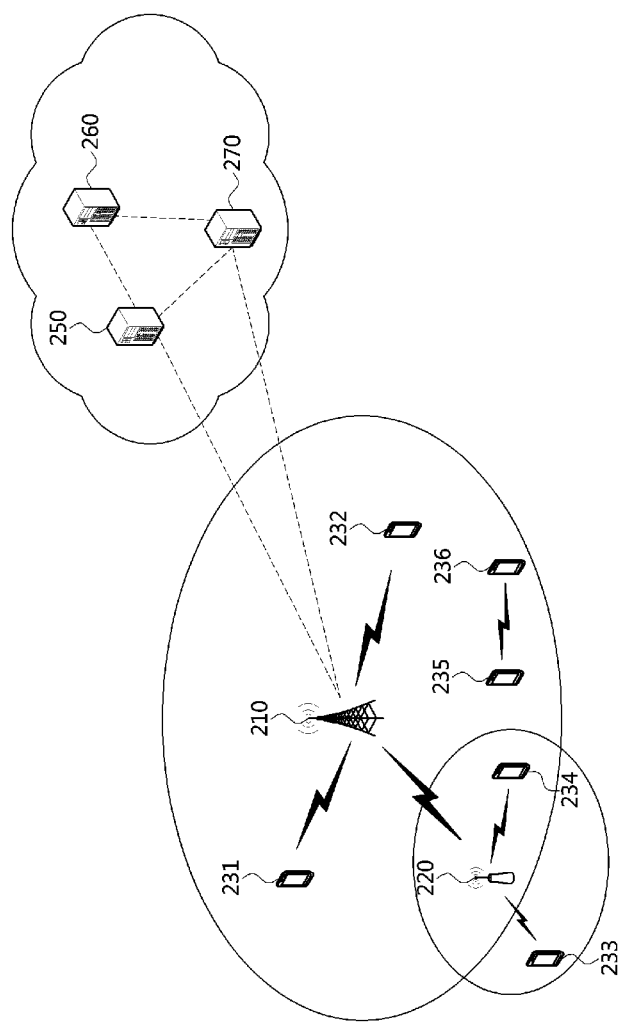
FIG. 2 is a conceptual diagram illustrating embodiments of a cellular communication system.

FIG. 2 is a conceptual diagram illustrating embodiments of a cellular communication system.

As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, or the core network constituted by the UPF 250, the SMF 260, and the AMF 270 may support the 4G communication technology as well as the 5G communication technology.

Also, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

Figure 3:
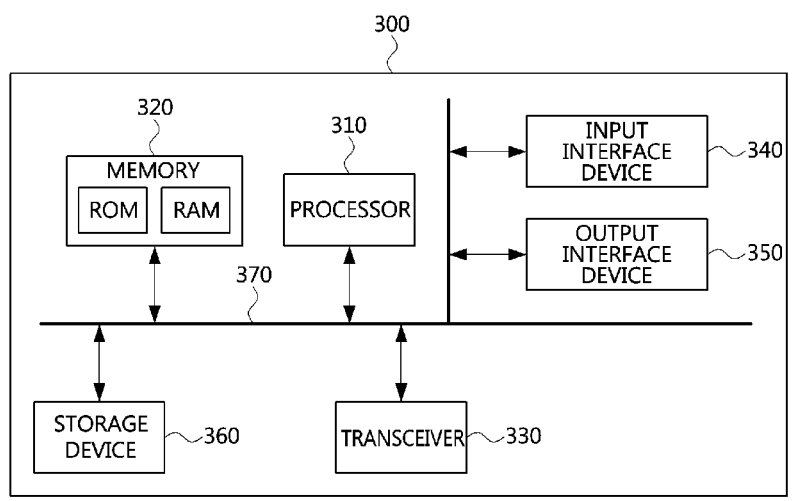
FIG. 3 is a conceptual diagram illustrating embodiments of a communication node constituting a cellular communication system.

FIG. 3 is a conceptual diagram illustrating embodiments of a communication node constituting a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station a subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
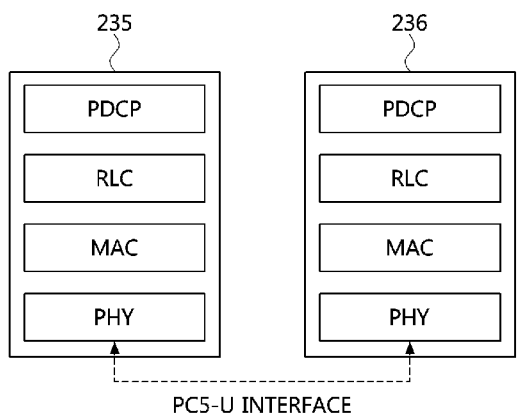
FIG. 4 is a block diagram illustrating embodiments of a user plane protocol stack of an UE performing sidelink communication.

FIG. 4 is a block diagram illustrating embodiments of a user plane protocol stack of an UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
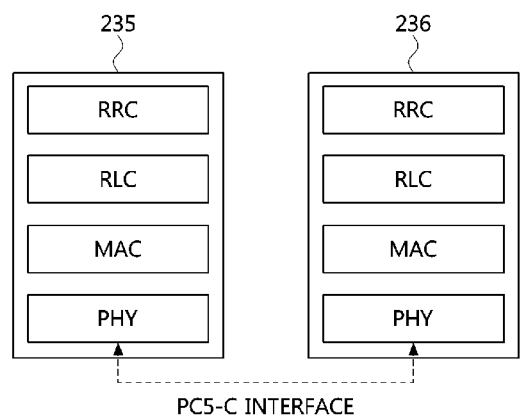
FIG. 5 is a block diagram illustrating a first embodiment of a control plane protocol stack of an UE performing sidelink communication.
Figure 6:
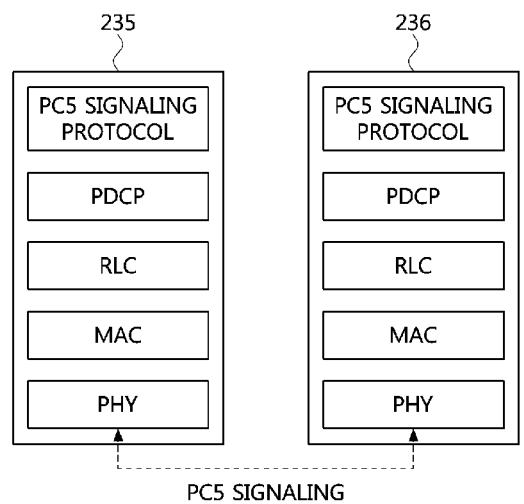
FIG. 6 is a block diagram illustrating a second embodiment of a control plane protocol stack of an UE performing sidelink communication.

FIG. 5 is a block diagram illustrating a first embodiment of a control plane protocol stack of an UE performing sidelink communication, and FIG. 6 is a block diagram illustrating a second embodiment of a control plane protocol stack of an UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236.

Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, methods for load distribution using a plurality of carriers (e.g., a plurality of channels) in the communication system (e.g., the cellular communication system) supporting V2X communications as set forth above will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of the vehicle 100 is described, the corresponding vehicle 110 may perform an operation corresponding to the operation of the vehicle 100. Conversely, when an operation of the vehicle 110 is described, the corresponding vehicle 100 may perform an operation corresponding to the operation of the vehicle 110. In the embodiments described below, the operation of the vehicle may be the operation of the communication node located in the vehicle.

In the communication system supporting V2X communications, the vehicle may perform communications based on the CA scheme. For example, the vehicle may perform communications using a primary carrier and one or more secondary carriers. The carrier used for the V2X communications (e.g., V2X service) may be determined based on channel state information (e.g., channel busy ratio (CBR)). The CBR may indicate congestion, occupancy state, load state, etc. of the corresponding carrier (e.g., channel). In this case, the vehicle may measure the CBR in the carrier according to a periodic or specific event, and may transmit the measured CBR to the base station. The base station may identify a channel congestion (e.g., occupancy state, load state, etc.) based on the CBR measured by the vehicle, and determine resources (e.g., carrier, resource pool, etc.) to be allocated to the vehicle based on the measured channel congestion.

When the sidelink TM 3 is used, the base station may configure time-frequency resources used for data transmission and may inform the vehicle of information on the configured time-frequency resources (i.e., scheduling information). Also, the base station may allocate time-frequency resources based on a semi-persistent scheduling (SPS)

scheme. For example, the base station may configure up to eight SPS configurations having different parameters, and may transmit a SPS configuration activation message or a SPS deactivation request message to the vehicle through a signaling procedure.

The SPS configuration may be configured based on UE assistance information received from the vehicle. The UE assistance information may include traffic characteristic parameters, and the traffic characteristic parameters may include a set of preferred or expected SPS intervals, a timing offset associated with a subframe #0 within a system frame of a system frame number (SFN) #0, a ProSe Per-Packet Priority (PPPP), a maximum Transport Block Size (TBS) according to a traffic pattern, or the like.

When the sidelink TM 4 is used, the base station may configure the resource pool used for data transmission and may inform the vehicle of information on the configured resource pool. In this case, the vehicle may select a time-frequency resource that is not used by other communication nodes through channel sensing in the resource pool, and may perform communications using the selected time-frequency resource. For example, the time-frequency resource may be selected based on a distributed congestion control scheme. Also, the vehicle may adjust transmission parameters (e.g., a maximum transmission power, a range of retransmission counts per transport block (TB), etc.) based on the CBR, and perform communications using the adjusted transmission parameters. When the sidelink TM 4 is used, a vehicle located outside the coverage of the base station may also perform communications using time-frequency resources in a resource pool pre-configured by the base station.

However, when the sidelink TM 3 and the SPS scheme are used, when a load on the carrier on which the SPS configuration is activated increases, data of the vehicle (e.g., data having high reliability and low latency requirements, DENM, CAM, etc.) may not be successfully transmitted or received. Also, a transmission latency of the data may increase, and thus a requested quality of service (QoS) may not be satisfied. The load distribution methods to solve this problem may be as follows.

Figure 7:
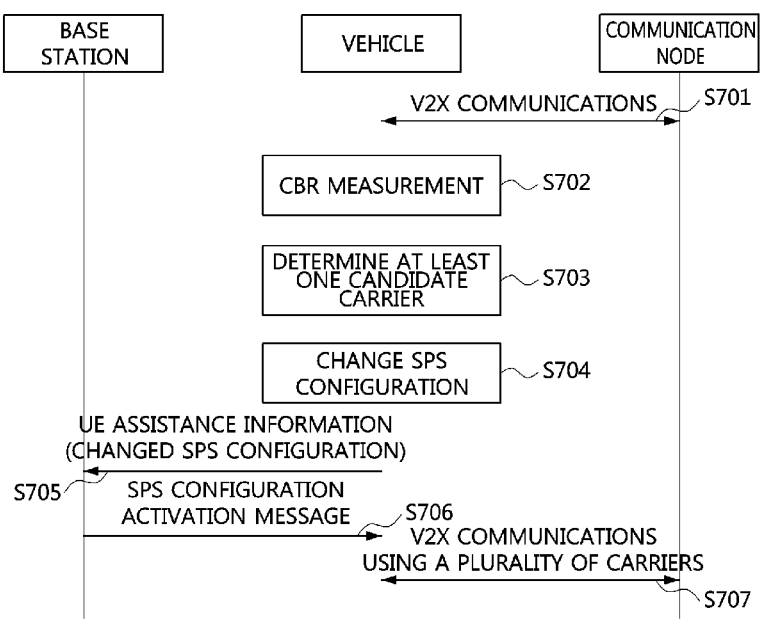
FIG. 7 is a sequence chart illustrating a first embodiment of a load distribution method using a plurality of carriers according to the present disclosure.

FIG. 7 is a sequence chart illustrating a first embodiment of a load distribution method using a plurality of carriers according to the present disclosure.

As shown in FIG. 7, a communication system supporting V2X communications may include a vehicle (e.g., a communication node located in a vehicle), a communication node, a base station, and the like. For example, the vehicle of FIG. 7 may be the vehicle 100 of FIG. 1, and the communication node of FIG. 7 may be the communication node located in vehicle 110 of FIG. 1, the communication located in infrastructure 120, or the communication node carried by the person 130. The base station of FIG. 7 may be the base station belonging to the cellular communication system 140 of FIG. 1. The V2X communications may be performed based on the side link TM 3 and the SPS scheme, and may be performed using aggregated carriers (e.g., carriers to which the CA scheme is applied). Data which is transmitted and received based on the SPS scheme may indicates "SPS traffic," and the carrier may indicates "a frequency band," "a V2X frequency band," or "a V2X frequency." Also, the vehicle, the communication node, and the base station in FIG. 7 may support the sidelink TM 4 as well as the sidelink TM 3.

The vehicle may perform V2X communications with the communication node based on the SPS configuration set by the base station (S701). Here, the V2X communications may be performed using one or more carriers. The vehicle may measure channel states (e.g., CBRs) for the one or more carriers on which the V2X communications are performed (S702). Also, the vehicle may measure channel states of all the carriers configured for the vehicle as well as the one or more carriers on which the V2X communications are performed. That is, the vehicle may measure CBRs for all the aggregated carriers (e.g., all carriers to which the CA scheme is applied). The CBR measurement may be performed periodically or when a specific event (e.g., a request from the base station) occurs. The vehicle may compare the measured CBR with a predetermined threshold value and determine that an overload has occurred in the corresponding carrier if the measured CBR is equal to or greater than the predetermined threshold value.

When an overload occurs in the carrier, the vehicle may determine at least one candidate carrier capable of load distribution (S703). The at least one candidate carrier may include a carrier that can be activated among the carriers used in the step S701 and the aggregated carriers. For example, a carrier having a CBR below the predetermined threshold value among the aggregated carriers may be determined as the candidate carrier.

In case that the SPS configuration of the one or more carriers used in the step S701 for the V2X communications is equally applied to the at least one candidate carrier determined in the step S703, the vehicle may transmit, to the base station, UE assistance information including information (hereinafter, "candidate carrier information") on the at least one candidate carrier (e.g., indexes of candidate carriers, the number of candidate carriers, etc.) determined in the step S703 (S705). Alternatively, in the step S705, sidelink UE information may be used instead of the UE assistance information. The UE assistance information or the sidelink UE information may be transmitted via a primary carrier. The candidate carrier information included in the UE assistance information (or sidelink UE information) may be information indicating one or more available frequency bands for transmission of the SPS traffic. For example, the candidate carrier information included in the UE assistance information (or sidelink UE information) may indicate a set of frequency bands. When the available frequency bands for the V2X communication are frequency bands #1 to #3, the set of frequency bands may be set as shown below in Table 3.

TABLE 3

| Set of frequency band | Frequency band #1 | Frequency band #2 | Frequency band #3 |
|---|---|---|---|
| 000 | x | x | x |
| 001 | ○ | x | x |
| 010 | ○ | ○ | x |
| 011 | x | ○ | x |
| 100 | x | ○ | ○ |
| 101 | x | x | ○ |
| 110 | ○ | x | ○ |
| 111 | ○ | ○ | ○ |

The frequency band which is represented as "x" in Table 3 may indicate an unavailable frequency band for transmission of the SPS traffic, and the frequency band which is represented as "○" in Table 3 may indicate the available frequency band for transmission of the SPS traffic. For example, when the candidate carrier information included in UE assistance information is set to "100," the base station may determine that the frequency bands #2 and #3 are available for transmission of the SPS traffic.

Alternatively, the available frequency band indicated by the UE assistance information (or sidelink UE information) may be represented in a bitmap. When the available frequency bands for the V2X communication are frequency bands #1 to #4, the first bit of the bitmap consisting of 4 bits may indicate availability of the frequency band #1, the second bit of the bitmap consisting of 4 bits may indicate availability of the frequency band #2, the third bit of the bitmap consisting of 4 bits may indicate availability of the frequency band #3, and the fourth bit of the bitmap consisting of 4 bits may indicate availability of the frequency band #4. For example, when the information indicating the frequency band included in the UE assistance information (or sidelink UE information) is set to "1011", the UE assistance information (or sidelink UE information) may indicates that the frequency bands #1, #3, and #4 are available for transmission of the SPS traffic.

Alternatively, the candidate carrier information included in the UE assistance information (or sidelink UE information) may be the layer 2-ID (e.g., destination layer 2-ID). Because the layer 2-ID (e.g., destination layer 2-ID) may be set for the V2X service and the frequency band may be set for the V2X service, the layer 2-ID (e.g., destination layer 2-ID) may indicate the frequency band. In this case, the vehicle may transmit the UE assistance information (or sidelink UE information) including the layer 2-ID (e.g., destination layer 2-ID) that is mapped to the available frequency band for the V2X communication to the base station. When the UE assistance information (or sidelink UE information) is received from the vehicle, the base station may identify the layer 2-ID (e.g., destination layer 2-ID) included in the UE assistance information and identify the available frequency band for V2X communication in the vehicle based on the layer 2-ID (e.g., destination layer 2-ID).

Meanwhile, the base station may receive the UE assistance information from the vehicle, and identify the candidate carrier information included in the UE assistance information. In this case, the base station may transmit a message (hereinafter referred to as "SPS configuration activation message") indicating activation of the SPS configuration in the at least one candidate carrier indicated by the UE assistance information to the vehicle (S706). The SPS configuration activation message may also be transmitted to the communication node. The SPS configuration activation message may indicate at least one index of the at least one candidate carrier for which the SPS configuration is activated.

The vehicle may receive the SPS configuration activation message from the base station and may perform V2X communications with the communication node using at least one anchor carrier (i.e., the at least one carrier used for the V2X communications in the step S701) and the at least one candidate carrier (S707). Alternatively, the vehicle may perform V2X communications with the communication node using the at least one anchor carrier and the at least one candidate carrier without receiving the SPS configuration activation message after the transmission of the UE assistance information (S707). Here, the SPS configuration applied to the V2X communications using the at least one anchor carrier and the at least one candidate carrier may be the same as the SPS configuration applied to the V2X communications in the step S701.

Also, the candidate carrier information (e.g., indexes of candidate carriers, the number of candidate carriers, etc.) used for the V2X communications between the vehicle and the communication node may be transmitted from the vehicle to the communication node before the step S707. For example, the vehicle may generate an SCI that includes the candidate carrier information. When a SCI format 1 is used, the SCI format 1 may further include a changed SPS configuration, an application flag, etc. in addition to the existing information. In this case, the SCI format 1 may include information elements (IEs) shown below in Table 4. The candidate carrier information may be included in the changed SPS configuration.

TABLE 4

| IE | Description |
| --- | --- |
| MCS | Modulation and Coding Scheme (MCS) used for V2X communications |
| Priority | Priority of Transport Block (TB), which is configured by a higher layer signaling |
| Time Gap | Time gap between initial transmission and retransmission Frequency resource positions of initial transmission and retransmission |
| Resource reservation interval | Resource reservation interval in V2X communications |
| Changed SPS configuration | Candidate carrier information (indexes and the number of candidate carriers) Data transmission interval Offset between data transmission intervals Size of data which can be transmitted in each carrier |
| Application flag | Information indicating a time point at which the changed SPS configuration is applied |

The application flag may be set to 0 or 1. The application flag set to 0 may indicate that the changed SPS configuration indicated by the SCI is applied after transmission of the corresponding SCI. The application flag set to 1 may indicate that the changed SPS configuration indicated by the SCI is applied from transmission of the corresponding SCI. Alternatively, a new SCI format may be defined that includes the changed SPS configuration and the application flag, and the vehicle may use the new SCI format to inform the communication node of the changed SPS configuration.

The vehicle may transmit the SCI (or, SCI+data) to the communication node. The communication node may receive the SCI from the vehicle, identify the changed SPS configuration included in the SCI, and identify a time point at which the changed SPS configuration is applied based on the application flag included in the SCI. Therefore, in the step S707, the vehicle and the communication node may perform V2X communications using the changed SPS configuration at the time indicated by the application flag.

Meanwhile, the SPS configuration (e.g., SPS parameters) may be changed based on the number of candidate carriers determined in the step S703. In this case, the vehicle may change the SPS configuration based on the number of candidate carriers (S704). The step S704 may be performed based on a SPS configuration change scheme 1, 2 or 3.

SPS Configuration Change Scheme 1

When a sum of the number of at least one anchor carriers (i.e., the number of carriers used for V2X communications in the step S701) and the number of at least one candidate carrier is N, and a data transmission interval in the SPS configuration of the at least one anchor carrier is T transmission time intervals (TTIs), the vehicle may set a data transmission interval to N×T TTIs in each of the at least one anchor carrier and the at least one candidate carrier, and set an offset between data transmission intervals of the N carriers (e.g., the at least one anchor carrier and the at least one candidate carrier) to T TTIs. For example, when N is 2 and T is 5, the data transmission interval in each of two carriers (e.g., carriers 0 and 1) may be set to 10 TTIs, and an offset between data transmission intervals of the two carriers may be set to 5 TTIs. That is, when a radio frame is composed of subframes 0 to 9, the V2X communications may be performed using the subframe 0 in the carrier 0, and performed using the subframe 5 in the carrier 1.

SPS Configuration Change Scheme 2

When a sum of the number of at least one anchor carrier (i.e., the number of carriers used for V2X communications in the step S701) and the number of at least one candidate carrier is N, and a data transmission interval in the SPS configuration of the at least one anchor carrier is T TTIs, the vehicle may maintain the data transmission interval to be T TTIs in the at least one anchor carrier and the at least one candidate carrier, set an offset between data transmission intervals of the N carriers (e.g., the at least one anchor carrier and the at least one candidate carrier) to M TTIs (M is an integer equal to or greater than 0), and set a size of data transmitted through each of the N carriers to (a size of total data to be transmitted to the communication node/N). That is, data of the same size may be transmitted in each of the N carriers.

For example, when N is 2, T is 5, M is 0, and the size of total data corresponds to 10 TBs, the data transmission interval in each of the two carriers may be set to 5 TTIs, an offset between data transmission intervals of the two carriers may be set to 0 TTI, and the size of data transmitted in each of the two carriers may correspond to 5 TBs.

SPS Configuration Change Scheme 3

When a sum of the number of at least one anchor carrier (i.e., the number of carriers used for V2X communications in the step S701) and the number of at least one candidate carrier is N, and the data transmission interval in the SPS configuration of the at least one anchor carrier is T TTIs, the vehicle may maintain the data transmission interval to be T TTIs in the at least one anchor carrier and the at least one candidate carrier, set an offset between data transmission intervals of the N carriers (e.g., the at least one anchor carrier and the at least one candidate carrier) to M TTIs (M is an integer greater than or equal to 0), and set the size of data transmitted through each of the N carriers to be in inverse proportion to the CBR of each of the N carriers. That is, data can be distributed in consideration of channel congestion in each of the N carriers.

For example, when N is 2, T is 5, M is 0, the size of total data corresponds to 10 TBs, the CBR in the anchor carrier is 80%, and the CBR in the candidate carrier is 20%, the data transmission interval in each of the two carriers may be set to 5 TTIs, an offset between the data transmission intervals of the two carriers may be set to 0 TTI, the size of data transmitted through the anchor carrier may correspond to 2 TBs, and the size of data transmitted through the candidate carrier may correspond to 8 TBs.

When the step S704 is completed, the vehicle may generate UE assistance information including the changed SPS configuration (e.g., changed SPS parameters). When the SPS configuration change scheme 1 is used, the UE assistance information may include the candidate carrier information (e.g., indexes of candidate carriers, the number of candidate carriers), the data transmission interval (N×T), the offset between data transmission intervals (T), and the like. When the SPS configuration change scheme 2 is used, the UE assistance information may include the candidate carrier information (e.g., indexes of candidate carriers, the number of candidate carriers), the data transmission interval (T), the offset between data transmission intervals (M), the size of data which can be transmitted in each carrier (i.e., the size of data is the same in all carriers), and the like. When the SPS configuration change scheme 3 is used, the UE assistance information may include the candidate carrier information (e.g., indexes of candidate carriers, the number of candidate carriers), the data transmission interval (T), the offset between data transmission intervals (M), the size of data which can be transmitted in each carrier (i.e., the size of data is inversely proportional to the channel congestion of each carrier), and the like.

The vehicle may transmit the UE assistance information including the changed SPS configuration (e.g., changed SPS parameters) to the base station (S705). The UE assistance information may be transmitted via the primary carrier. The candidate carrier information included in the UE assistance information may be information indicating the available frequency band for transmission of the SPS traffic. For example, the candidate carrier information included in the UE assistance information may indicate the set of available frequency bands for transmission of the SPS traffic (e.g., the set described in Table 3). Alternatively, the available frequency band indicated by the UE assistance information may be represented in the bitmap. Alternatively, the candidate carrier information included in the UE assistance information may be the layer 2-ID (e.g., destination layer 2-ID), and the layer 2-ID (e.g., destination layer 2-ID) may be mapped to the frequency band.

Meanwhile, the base station may receive the UE assistance information from the vehicle and may identify the changed SPS configuration included in the UE assistance information. In this case, the base station may transmit a SPS configuration activation message to the vehicle indicating activation of the changed SPS configuration indicated by the UE assistance information (S706). The SPS configuration activation message may also be transmitted to the communication node. The SPS configuration activation message may indicate indexes of the carriers on which the changed SPS configuration is activated.

The vehicle may receive the SPS configuration activation message from the base station and may perform V2X communications with the communication node in the at least one anchor carrier and the at least one candidate carrier using the changed SPS configuration (S707). Alternatively, the vehicle may perform V2X communications with the communication node in the at least one anchor carrier and the at least one candidate carrier using the changed SPS configuration without receiving the SPS configuration active message after transmission of the UE assistance information (S707).

Also, the changed SPS configuration (e.g., the candidate carrier information, the data transmission interval, the offset between data transmission intervals, the size of data that can be transmitted through each carrier) used in the step S707 for V2X communications between the vehicle and the communication node may be transmitted from the vehicle to the communication node before the step S707. For example, the vehicle may generate a SCI including information elements described above in Table 4 (e.g., the changed SPS configuration, the application flag, etc.), and transmit the SCI (or, SCI+data) to the communication node. The communication node may receive the SCI from the vehicle, identify the changed SPS configuration included in the SCI, and identify the time point at which the changed SPS configuration is applied based on the application flag included in the SCI. Therefore, in the step S707, the vehicle and the communication node may perform V2X communications using the changed SPS configuration at the time indicated by the application flag.

Figure 8:
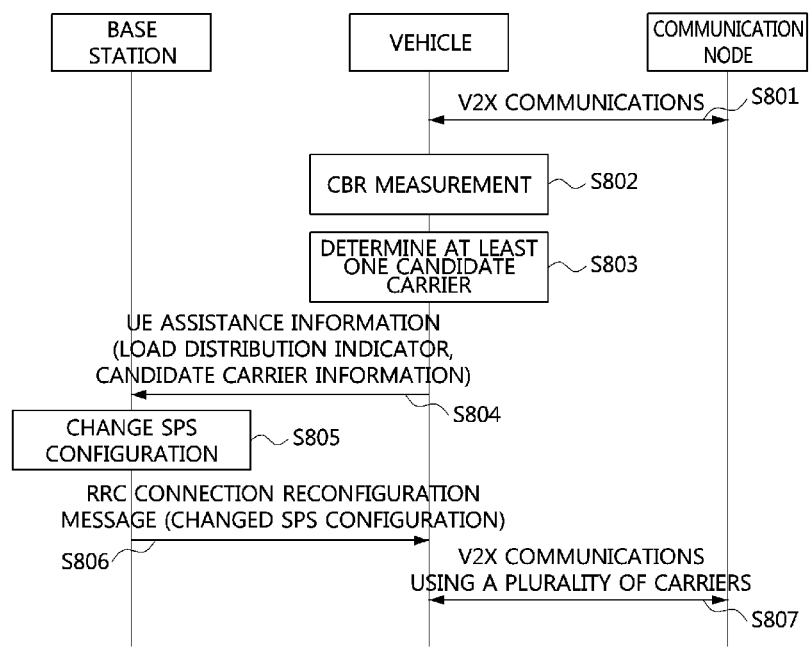
FIG. 8 is a sequence chart illustrating a second embodiment of a load distribution method using a plurality of carriers according to the present disclosure.

FIG. 8 is a sequence chart illustrating a second embodiment of a load distribution method using a plurality of carriers according to the present disclosure.

As shown in FIG. 8, a communication system supporting V2X communications may include a vehicle (e.g., a communication node located in a vehicle), a communication node, a base station, and the like. For example, the vehicle of FIG. 8 may be the vehicle 100 of FIG. 1 and the communication node of FIG. 8 may be the communication node located in vehicle 110 of FIG. 1, the communication located in infrastructure 120, or the communication node carried by the person 130. The base station of FIG. 8 may be the base station belonging to the cellular communication system 140 of FIG. 1. The V2X communications may be performed based on the side link TM 3 and the SPS scheme, and may be performed using aggregated carriers (e.g., carriers to which the CA scheme is applied). Data which is transmitted and received based on the SPS scheme may indicates "SPS traffic," and the carrier may indicates "a frequency band," "a V2X frequency band," or "a V2X frequency." Also, the vehicle, the communication node, and the base station in FIG. 8 may support the sidelink TM 4 as well as the sidelink TM 3.

The vehicle may perform V2X communications with the communication node based on the SPS configuration set by the base station (S801). Here, the V2X communications may be performed using one or more carriers. The vehicle may measure channel states (e.g., CBRs) for the one or more carriers on which the V2X communications are performed (S802). Also, the vehicle may measure channel states of all the carriers configured for the vehicle as well as the one or more carriers on which the V2X communications are performed. That is, the vehicle may measure CBRs for all the aggregated carriers (e.g., all carriers to which the CA scheme is applied). The CBR measurement may be performed periodically or when a specific event (e.g., a request from the base station) occurs. The vehicle may compare the measured CBR with a predetermined threshold value and determine that an overload has occurred in the corresponding carrier if the measured CBR is greater than or equal to the predetermined threshold value.

When an overload occurs in the carrier, the vehicle may determine at least one candidate carrier capable of load distribution (S803). The at least one candidate carrier may include a carrier that can be activated among the carriers used in the step S801 and the aggregated carriers. For example, a carrier having a CBR below the predetermined threshold value among the aggregated carriers may be determined as the candidate carrier. The vehicle may generate UE assistance information including a load distribution indicator, candidate carrier information (e.g., indexes of candidate carriers, the number of candidate carriers), and the like. The load distribution indicator may request load distribution using the at least one candidate carrier indicated by the UE assistance information.

The vehicle may transmit the UE assistance information including the load distribution indicator, the candidate carrier information, and the like to the base station (S804). Alternatively, sidelink UE information may be used in the step S804 instead of the UE assistance information. The UE assistance information or the sidelink UE information may be transmitted via the primary carrier. The candidate carrier information included in the UE assistance information (or sidelink UE information) may be information indicating the available frequency band for transmission of the SPS traffic. For example, the candidate carrier information included in the UE assistance information (or sidelink UE information) may indicate the set of available frequency bands for transmission of the SPS traffic (e.g., the set described above in Table 3). Alternatively, the available frequency band indicated by the UE assistance information (or sidelink UE information) may be represented in the bitmap. Alternatively, the candidate carrier information included in the UE assistance information may be the layer 2-ID (e.g., destination layer 2-ID), and the layer 2-ID (e.g., destination layer 2-ID) may be mapped to the frequency band.

Meanwhile, the base station may receive the UE assistance information from the vehicle, and identity that the load distribution using the at least one candidate carrier is requested based on the information (e.g., the load distribution indicator, the candidate carrier information) included in the UE assistance information.

When the SPS configuration of the at least one anchor carrier used for V2X communications in the step S801 is equally applied to the at least one candidate carrier determined in the step S803, the base station may transmit a SPS configuration activation message indicating activation of the SPS configuration in the at least one candidate carrier without reconfiguring the SPS configuration. The SPS configuration activation message may also be transmitted to the communication node. The SPS configuration activation message may indicate the index of the at least one candidate carrier for which the SPS configuration is activated. Here, the SPS configuration activation message may be an RRC signaling message.

The vehicle may receive the SPS configuration activation message from the base station and perform V2X communications with the communication node using the at least one anchor carrier (i.e., the at least one carrier used for V2X communications in the step S801) and the at least one candidate carrier (S807). Alternatively, the vehicle may perform V2X communications with the communication node using the at least one anchor carrier and the at least one candidate carrier without receiving the SPS configuration activation message after the transmission of the UE assistance information (S807).

Also, the candidate carrier information (e.g., indexes of candidate carriers, the number of candidate carriers) used in the step S807 for V2X communications between the vehicle and the communication node may be transmitted from the vehicle to the communication node before the step S807. For example, the vehicle may generate a SCI including information elements described above in Table 4 (e.g., the changed SPS configuration, the application flag, etc.), and transmit the SCI (or, SCI+data) to the communication node. The communication node may receive the SCI from the vehicle, identify the changed SPS configuration included in the SCI, and identify the time point at which the changed SPS configuration is applied based on the application flag included in the SCI. Therefore, in the step S807, the vehicle and the communication node may perform V2X communications using the changed SPS configuration at the time indicated by the application flag.

Meanwhile, the SPS configuration (e.g., SPS parameters) may be changed based on the number of candidate carriers determined in the step S803. In this case, the base station may change the SPS configuration based on the number of candidate carriers (S805). For example, the base station may determine one or more frequency bands to which the SPS configuration is applied among the frequency bands (e.g., candidate carriers) indicated by the UE assistance information, and may change the SPS configuration based on the determined one or more frequency bands. The step S805 may be performed based on the SPS configuration change scheme 1, 2 or 3 described in the embodiment of FIG. 7. In the embodiment of FIG. 7, the SPS configuration change scheme 1, 2 or 3 is performed by the vehicle. However, in the embodiment of FIG. 8, the SPS configuration change scheme 1, 2 or 3 may be performed by the base station instead of the vehicle. That is, the operation of the base station performing the SPS configuration change scheme 1, 2 or 3 in the embodiment of FIG. 8 may be the same as the operation of the vehicle performing the SPS configuration change scheme 1, 2 or 3 in the embodiment of FIG. 7.

When the step S805 is completed, the base station may generate an RRC connection reconfiguration message including the changed SPS configuration (e.g., changed SPS parameters). When the SPS configuration change scheme 1 is used, the RRC connection reconfiguration message may include the candidate carrier information (e.g., indexes of candidate carriers, the number of candidate carriers), the data transmission interval (N×T), the offset between data transmission intervals (T), and the like. When the SPS configuration change scheme 2 is used, the RRC connection reconfiguration message may include the candidate carrier information (e.g., indexes of candidate carriers, the number of candidate carriers), the data transmission interval (T), the offset between data transmission intervals (M), the size of data which can be transmitted in each carrier (i.e., the size of data is the same in all carriers), and the like. When the SPS configuration change scheme 3 is used, the RRC connection reconfiguration message may include the candidate carrier information (e.g., indexes of candidate carriers, the number of candidate carriers), the data transmission interval (T), the offset between data transmission intervals (M), the size of data which can be transmitted in each carrier (i.e., the size of data is inversely proportional to the channel congestion of each carrier), and the like.

The base station may transmit the RRC connection reconfiguration message including the changed SPS configuration (e.g., changed SPS parameters) to the vehicle (S806). The RRC connection reconfiguration message may also be transmitted to the communication node performing V2X communications with the vehicle. Alternatively, the changed SPS configuration (e.g., changed SPS parameters) may be transmitted to the vehicle via a SPS activation message (e.g., SPS activation request message) instead of the RRC connection reconfiguration message. The vehicle may receive the RRC connection reconfiguration message from the base station and may identify the changed SPS configuration included in the RRC connection reconfiguration message. Accordingly, the vehicle may perform V2X communications with the communication node in the at least one anchor carrier and the at least one candidate carrier using the changed SPS configuration (S807).

Also, the changed SPS configuration (e.g., the candidate carrier information, the data transmission interval, the offset between data transmission intervals, the size of data that can be transmitted through each carrier) used in the step S807 for V2X communications between the vehicle and the communication node may be transmitted from the vehicle to the communication node before the step S807. For example, the vehicle may generate a SCI including information elements described in Table 4 (e.g., the changed SPS configuration, the application flag, etc.), and transmit the SCI (or, SCI+data) to the communication node. The communication node may receive the SCI from the vehicle, identify the changed SPS configuration included in the SCI, and identify the time point at which the changed SPS configuration is applied based on the application flag included in the SCI. Therefore, in the step S807, the vehicle and the communication node may perform V2X communications using the changed SPS configuration at the time indicated by the application flag.

Figure 9:
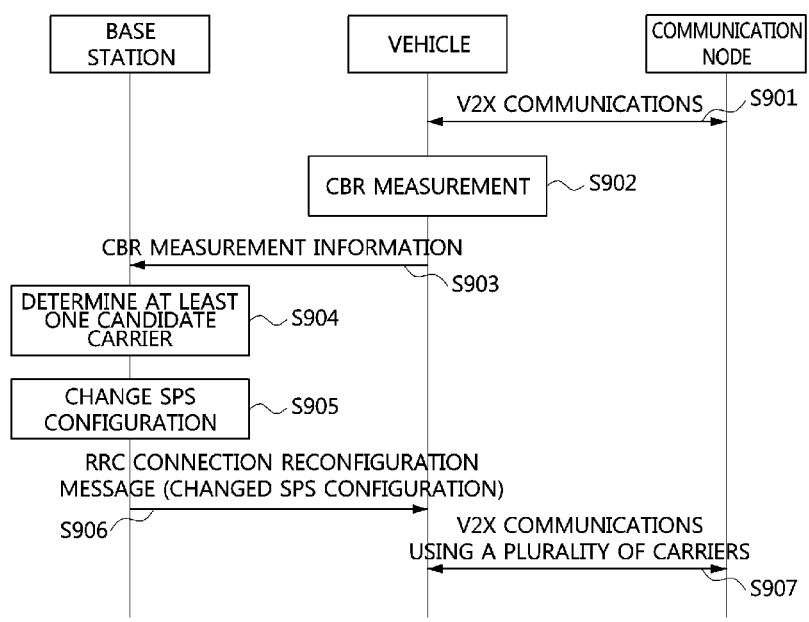
FIG. 9 is a sequence chart illustrating a third embodiment of a load distribution method using a plurality of carriers according to the present disclosure.

FIG. 9 is a sequence chart illustrating a third embodiment of a load distribution method using a plurality of carriers according to the present disclosure.

As shown in FIG. 9, a communication system supporting V2X communications may include a vehicle (e.g., a communication node located in a vehicle), a communication node, a base station, and the like. For example, the vehicle of FIG. 9 may be the vehicle 100 of FIG. 1 and the communication node of FIG. 9 may be the communication node located in vehicle 110 of FIG. 1, the communication located in infrastructure 120, or the communication node carried by the person 130. The base station of FIG. 9 may be the base station belonging to the cellular communication system 140 of FIG. 1. The V2X communications may be performed based on the side link TM 3 and the SPS scheme, and may be performed using aggregated carriers (e.g., carriers to which the CA scheme is applied). Data which is transmitted and received based on the SPS scheme may indicates "SPS traffic," and the carrier may indicates "a frequency band," "a V2X frequency band," or "a V2X frequency." Also, the vehicle, the communication node, and the base station in FIG. 9 may support the sidelink TM 4 as well as the sidelink TM 3.

The vehicle may perform V2X communications with the communication node based on the SPS configuration set by the base station (S901). Here, the V2X communications may be performed using one or more carriers. The vehicle may measure channel states of all the carriers configured for the vehicle as well as the one or more carriers on which the V2X communications are performed (S902). That is, the vehicle may measure CBRs for all the aggregated carriers (e.g., all carriers to which the CA scheme is applied). The CBR measurement may be performed periodically or when a specific event (e.g., a request from the base station) occurs.

The vehicle may transmit CBR measurement information (e.g., CBR for each carrier) to the base station (S903). The CBR measurement information may be transmitted via the primary carrier. Also, the vehicle may transmit the candidate carrier information (e.g., indexes of candidate carriers, the number of candidate carriers) to the base station together with the CBR measurement information. The at least one candidate carrier may be determined by the vehicle based on the CBR. The at least one candidate carrier may include a carrier that can be activated (e.g., a carrier capable of load distribution) among the aggregated carriers. For example, the vehicle may determine a carrier having a CBR that is less than a predetermined threshold value among the aggregated carriers as the candidate carrier.

The base station may receive the CBR measurement information from the vehicle. When the candidate carrier information is not received from the vehicle, the base station may determine at least one candidate carrier based on the CBR measurement information (S904). For example, the base station may determine at least one carrier having a CBR less than the predetermined threshold value, which is indicated by the CBR measurement information, as the at least one candidate carrier.

When the SPS configuration of the at least one carrier used for V2X communications in the step S901 is equally applied to the at least one candidate carrier determined in the step S904, the base station may transmit a SPS configuration activation message indicating activation of the SPS configuration in the at least one candidate carrier, without reconfiguring the SPS configuration. The SPS configuration activation message may also be transmitted to the communication node. The SPS configuration activation message may indicate the indexes of the candidate carriers for which the SPS configuration is activated. Here, the SPS configuration activation message may be an RRC signaling message.

The vehicle may receive the SPS configuration activation message from the base station and perform V2X communications with the communication node using the at least one anchor carrier (i.e., the at least one carrier used for V2X communications in the step S901) and the at least one candidate carrier (S907).

Also, information (e.g., indexes of candidate carriers, the number of candidate carriers) relating to the candidate carrier used in the step S907 for V2X communications between the vehicle and the communication node may be transmitted from the vehicle to the communication node before the step S907. For example, the vehicle may generate a SCI including information elements described in Table 4 (e.g., the changed SPS configuration, the application flag, etc.), and transmit the SCI (or, SCI+data) to the communication node. The communication node may receive the SCI from the vehicle, identify the changed SPS configuration included in the SCI, and identify the time point at which the changed SPS configuration is applied based on the application flag included in the SCI. Therefore, in the step S907, the vehicle and the communication node may perform V2X communications using the changed SPS configuration at the time indicated by the application flag.

Meanwhile, the SPS configuration (e.g., SPS parameters) may be changed based on the number of candidate carriers determined in the step 904. In this case, the base station may change the SPS configuration based on the number of candidate carriers (S905). The step S905 may be performed based on the SPS configuration change scheme 1, 2 or 3 described in the embodiment of FIG. 7. In the embodiment of FIG. 7, the SPS configuration change scheme 1, 2 or 3 is performed by the vehicle. However, in the embodiment of FIG. 9, the SPS configuration change scheme 1, 2 or 3 may be performed by the base station instead of the vehicle. That is, the operation of the base station performing the SPS configuration change scheme 1, 2 or 3 in the embodiment of FIG. 9 may be the same as the operation of the vehicle performing the SPS configuration change scheme 1, 2 or 3 in the embodiment of FIG. 7.

When the step S905 is completed, the base station may generate an RRC connection reconfiguration message including the changed SPS configuration (e.g., changed SPS parameters). When the SPS configuration change scheme 1 is used, the RRC connection reconfiguration message may include the candidate carrier information (e.g., indexes of candidate carriers, the number of candidate carriers), the data transmission interval (N×T), the offset between data transmission intervals (T), and the like. When the SPS configuration change scheme 2 is used, the RRC connection reconfiguration message may include the candidate carrier information (e.g., indexes of candidate carriers, the number of candidate carriers), the data transmission interval (T), the offset between data transmission intervals (M), the size of data which can be transmitted in each carrier (i.e., the size of data is the same in all carriers), and the like. When the SPS configuration change scheme 3 is used, the RRC connection reconfiguration message may include the candidate carrier information (e.g., indexes of candidate carriers, the number of candidate carriers), the data transmission interval (T), the offset between data transmission intervals (M), the size of data which can be transmitted in each carrier (i.e., the size of data is inversely proportional to the channel congestion of each carrier), and the like.

The base station may transmit the RRC connection reconfiguration message including the changed SPS configuration (e.g., changed SPS parameters) to the vehicle (S906). The RRC connection reconfiguration message may also be transmitted to the communication node performing V2X communications with the vehicle. The vehicle may receive the RRC connection reconfiguration message from the base station and may identify the changed SPS configuration included in the RRC reconfiguration message. Accordingly, the vehicle may perform V2X communications with the communication node in the at least one anchor carrier and the at least one candidate carrier using the changed SPS configuration (S907).

Also, the changed SPS configuration (e.g., the candidate carrier information, the data transmission interval, the offset between data transmission intervals, the size of data that can be transmitted through each carrier) used in the step S907 for V2X communications between the vehicle and the communication node may be transmitted from the vehicle to the communication node before the step S907. For example, the vehicle may generate a SCI including information elements described in Table 4 (e.g., the changed SPS configuration, the application flag, etc.), and transmit the SCI (or, SCI+data) to the communication node. The communication node may receive the SCI from the vehicle, identify the changed SPS configuration included in the SCI, and identify the time point at which the changed SPS configuration is applied based on the application flag included in the SCI. Therefore, in the step S907, the vehicle and the communication node may perform V2X communications using the changed SPS configuration at the time indicated by the application flag.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a first communication node in a communication system supporting Vehicle-to-Everything (V2X) communication, the operation method comprising:
determining at least one frequency band to be used for transmission of semi-persistent scheduling (SPS) traffic between the first communication node and a second communication node among a plurality of frequency bands for the first communication node;

generating user equipment (UE) assistance information including information indicating the at least one frequency band for the SPS traffic; and transmitting the UE assistance information to a base station supporting the V2X communication using a radio resource between the first communication node and the base station, wherein the information indicating the at least one frequency band indicates an available frequency band for transmission of the SPS traffic among aggregated frequency bands, the at least one frequency band indicated by the UE assistance information is used for determining one or more frequency bands to which a SPS configuration is applied, and the SPS traffic is transmitted in the one or more frequency bands including the at least one frequency band determined by the first communication node, and wherein the determining of the at least one frequency band comprises:

measuring congestion in a first frequency band used for the V2X communication with the second communication node; and determining the at least one frequency band for transmission of the SPS traffic when the congestion in the first frequency band is greater than or equal to a predetermined threshold.

2. The operation method according to claim 1, further comprising receiving, from the base station, a SPS configuration activation message for the frequency band determined based on the UE assistance information.

3. The operation method according to claim 2, wherein the SPS configuration activation message includes information indicating the frequency band to which the SPS configuration is applied.

4. The operation method according to claim 1, wherein the at least one frequency band is determined based on a channel busy ratio (CBR) measured by the first communication node.

5. The operation method according to claim 1, wherein the information indicating the at least one frequency band indicates a set of two or more frequency bands.

6. The operation method according to claim 1, further comprising generating the SPS configuration applied to the at least one frequency band, wherein the SPS configuration is transmitted to the base station using the UE assistance information.

7. The operation method according to claim 6, wherein, when a number of frequency bands to which the SPS configuration is applied is N and a transmission interval in a prior V2X communication procedure of the first communication node is T transmission time intervals (TTIs), a transmission interval in the SPS configuration is set to N×T TTIs, N is an integer greater than or equal to 2, and T is an integer greater than or equal to 1.

8. The operation method according to claim 6, wherein, when a number of frequency bands to which the SPS configuration is applied is N and a transmission interval in a prior V2X communication procedure of the first communication node is T TTIs, a transmission interval in the SPS configuration is set to T TTIs, a size of data transmitted through each of the N frequency bands equals (a size of total data to be transmitted to the second communication node which performs the V2X communication with the first communication node)/N, N is an integer greater than or equal to 2, and T is an integer greater than or equal to 1.

9. The operation method according to claim 6, wherein, when a number of frequency bands to which the SPS configuration is applied is N and a transmission interval in a prior V2X communication procedure of the first communication node is T TTIs, a transmission interval in the SPS configuration is set to T TTIs, a size of data transmitted through each of the N frequency bands is inversely proportional to a congestion of each of the N frequency bands, N is an integer greater than or equal to 2, and T is an integer greater than or equal to 1.

10. An operation method of a base station in a communication system supporting Vehicle-to-Everything (V2X) communication, the operation method comprising:

receiving, from a first communication node, user equipment (UE) assistance information including information indicating frequency bands to be used for transmission of semi-persistent scheduling (SPS) traffic between the first communication node and a second communication node;

determining at least one frequency band to which a SPS configuration is applied among the frequency bands indicated by the UE assistance information; and transmitting, to the first communication node, a SPS configuration activation message instructing activation of the SPS configuration for the at least one frequency band, wherein the information indicating the frequency bands for transmission of the SPS traffic indicates an available frequency band for transmission of the SPS traffic among aggregated frequency bands, the UE assistance information is received through a radio resource between the first communication node and the base station, and the SPS traffic is transmitted in the at least frequency band belonging to the frequency bands determined by the first communication node, and wherein the determining of the at least one frequency band comprises:

measuring, by the first communication node, congestion in a first frequency band used for the V2X communication with the second communication node; and determining, by the first communication node, the at least one frequency band for transmission of the SPS traffic when the congestion in the first frequency band is greater than or equal to a predetermined threshold.

11. The operation method according to claim 10, wherein the SPS configuration activation message includes information indicating the at least one frequency band to which the SPS configuration is applied.

12. The operation method according to claim 10, wherein the frequency bands for transmission of the SPS traffic are determined based on a channel busy ratio (CBR) measured by the first communication node.

13. The operation method according to claim 10, wherein the information indicating the frequency bands for transmission of the SPS traffic indicates a set of two or more frequency bands.

14. The operation method according to claim 10, further comprising generating the SPS configuration to be applied to the at least one frequency band, wherein the SPS configuration is transmitted to the first communication node via the SPS configuration activation message.

15. The operation method according to claim 14, wherein, when a number of frequency bands to which the SPS configuration is applied is N and a transmission interval in a prior V2X communication procedure of the first communication node is T transmission time intervals (TTIs), a transmission interval in the SPS configuration is set to N×T TTIs, N is an integer greater than or equal to 2, and T is an integer greater than or equal to 1.

16. The operation method according to claim 14, wherein, when a number of frequency bands to which the SPS configuration is applied is N and a transmission interval in a prior V2X communication procedure of the first communication node is T TTIs, a transmission interval in the SPS configuration is set to T TTIs, a size of data transmitted through each of the N frequency bands equals (a size of total data to be transmitted to the second communication node which performs the V2X communications with the first communication node)/N, N is an integer greater than or equal to 2, and T is an integer greater than or equal to 1.

17. The operation method according to claim 14, wherein, when a number of frequency bands to which the SPS configuration is applied is N and a transmission interval in a prior V2X communication procedure of the first communication node is T TTIs, a transmission interval in the SPS configuration is set to T TTIs, a size of data transmitted through each of the N frequency bands is inversely proportional to a congestion of each of the N frequency bands, N is an integer greater than or equal to 2, and T is an integer greater than or equal to 1.

* * * * *